United States Patent
Monnerat

(10) Patent No.: US 7,573,423 B2
(45) Date of Patent: Aug. 11, 2009

(54) METHOD OF ACQUIRING SATELLITE DATA

(75) Inventor: Michel Monnerat, L'Union (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 10/580,965

(22) PCT Filed: Nov. 22, 2004

(86) PCT No.: PCT/FR2004/002993

§ 371 (c)(1),
(2), (4) Date: May 31, 2006

(87) PCT Pub. No.: WO2005/066650

PCT Pub. Date: Jul. 21, 2005

(65) Prior Publication Data

US 2007/0139265 A1    Jun. 21, 2007

(30) Foreign Application Priority Data

Dec. 1, 2003    (FR) .................................. 03 14175

(51) Int. Cl.
*G01S 5/14* (2006.01)
*H04B 7/26* (2006.01)

(52) U.S. Cl. .......................... 342/357.15; 342/357.09; 342/357.12

(58) Field of Classification Search ............. 342/357.15, 342/357.05, 357.09, 357.12
See application file for complete search history.

(56) References Cited

U.S. PATENT DOCUMENTS

| 4,949,268 | A | | 8/1990 | Nishikawa |
| 4,998,111 | A | | 3/1991 | Ma |
| 5,663,734 | A | * | 9/1997 | Krasner .................. 342/357.12 |
| 5,874,914 | A | | 2/1999 | Krasner |
| 6,185,427 | B1 | * | 2/2001 | Krasner et al. ......... 342/357.09 |
| 6,313,787 | B1 | * | 11/2001 | King et al. ............... 342/357.1 |

FOREIGN PATENT DOCUMENTS

EP    1 146 349 A2    10/2001

\* cited by examiner

*Primary Examiner*—Thomas H Tarcza
*Assistant Examiner*—Fred H Mull
(74) *Attorney, Agent, or Firm*—Sughrue Mion, PLLC

(57) ABSTRACT

The present invention provides a method of acquisition of satellite data by a mobile device including a radio navigation satellite system (RNSS) receiver. The method includes: the receiver receiving a signal transmitted by a plurality of satellites and corresponding to a sum of signals each transmitted by a satellite and each modulated by a spread spectrum signal characteristic of said satellite; the receiver generating a plurality of local duplicates each of which is the duplicate of a spread spectrum signal characteristic of a satellite; correcting the frequency of each of the local duplicates by compensating the Doppler effect of each of the satellites; summing the plurality of corrected duplicates; and determining the correlation function as a function of time between the sum of the plurality of corrected duplicates and the satellite data signal.

7 Claims, 3 Drawing Sheets

METHOD OF ACQUIRING SATELLITE DATA

CROSS-REFERENCE TO RELATED APPLICATIONS

This application is based on French Patent Application No. 0314175 filed Jan. 12, 2003, the disclosure of which is hereby incorporated by reference thereto in its entirety, and the priority of which is hereby claimed under 35 U.S.C. §119.

BACKGROUND OF THE INVENTION

1. Field of the invention

The present invention relates to a method by which a mobile device including an RNSS satellite radio navigation receiver acquires satellite data.

2. Description of the prior art

In the field of mobile telephony, it is proving increasingly necessary to be able to locate mobile telephones.

To this end, it is known in the art to associate a cellular radio telephony device, for example of the Global System for Mobile communications (GSM) mobile telephone type, with a Radio Navigation Satellite System (RNSS) receiver such as a Global Positioning System (GPS), GLONASS or GALILEO type receiver by means of which the mobile device picks up transmissions from satellites to determine its position. Thus in the event of a road traffic accident, for example, the mobile device can calculate and transmit its position.

The position of the device may be determined in the following manner: a plurality of satellites transmit continuously a time-stamped signal that is picked up by the receiver. If it is synchronized to the clock of the satellites, the receiver can then measure the propagation time of this signal and deduce therefrom a distance between it and a particular satellite. Using three satellites, a receiver of the above kind can determine its position by triangulation. Each propagation time measurement represents the radius of a sphere centered on a particular satellite, the receiver being situated on that sphere. With two distance measurements, the position of a receiver is within a circle formed by the intersection of two spheres. A simultaneous third measurement reduces the intersection to two points, one of which is at a great distance away in space and is easily ignored.

In a satellite positioning system using RNSS type receivers, the data signals enabling the position of the receiver to be calculated come from different satellites (a minimum of four satellites to determine four unknowns x, y, z and t).

The GPS signal transmitted by each of the satellites is based on a spread spectrum technique. Thus the signal is a binary data signal modulated by a signal whose spectrum has been spread using a code division multiple access (CDMA) technique. In other words, each bit of the data signal is replaced by a spreading sequence specific to each satellite. The data is transmitted in serial mode at 50 bps (0.02 s/bit). A spreading sequence such as a Gold type pseudo-random sequence is transmitted at a much higher rate: a Gold sequence may be considered as a series of bits clocked at a clearly defined clock period; the expression "code moment" or the more frequently encountered term "chip" designates a bit of the sequence and, by extension, its duration. The spreading sequence is therefore transmitted at a rate of 1.023 Mchip/s (the duration of a chip is therefore approximately 1 µs) and includes 1023 chips (i.e. it has a duration of 1 ms); there are therefore 20 sequence repetitions per data bit.

As a result of modulation by the spread spectrum signal, a standard demodulator sees the received signal as noise.

As a general rule, the correlation function $f(\tau)$ of two signals $f_i(t)$ and $f_j(t)$ is given by the equation $$f(\tau) = \int_{+\infty}^{-\infty} f_i(t) \cdot f_j(t-\tau) \cdot dt,$$

in which $\tau$ designates a variable time. Of course, in practice, the integration is not effected from $-\infty$ to $+\infty$, but over a finite time period, the integral being divided by the duration of said period. The expression "autocorrelation" function is used if the functions $f_i(t)$ and $f_j(t)$ are identical and the expression "intercorrelation function" is used if the functions $f_i(t)$ and $f_j(t)$ are different.

Each satellite k has its own pseudo-random signal $c_k(t)$. Each of these pseudo-random signals has the property that its autocorrelation function is null except in the vicinity of the null time shift, where it assumes a triangular shape; in other words, the integral $$\int_{+\infty}^{-\infty} c_k(t) \cdot c_k(t-\tau) \cdot dt$$

is null when $\tau$ is non-null and is at a maximum when $\tau$ is null.

Furthermore, the signals associated with different satellites are selected so that their intercorrelation function is null; in other words, the integral $$\int_{+\infty}^{-\infty} c_k(t) \cdot c_{k'}(t-\tau) \cdot dt$$

is null regardless of the value of $\tau$ when k and k' are different.

The spread spectrum signals from the satellites are therefore selected to be orthogonal.

When the receiver is seeking to acquire data from a particular satellite, it correlates the received signal with a duplicate of the pseudo-random sequence of the satellite it is looking for (the sequence of the satellite is assigned to it once and for all and does not change during the service life of the satellite).

The received signal S(t) is therefore the sum of all the signals transmitted by each satellite:

$$S(t) = \sum_{k=1}^{n} c_k(t) \cdot d_k(t),$$

where n is the number of satellites, $c_k(t)$ is the spread spectrum signal from the satellite k and $d_k(t)$ is the data from the satellite k.

When seeking to acquire data from the satellite m, the local duplicate corresponds to the signal $c_m(t)$. Accordingly, after correlation, and assuming that the spread spectrum signals are perfectly orthogonal, all the data from the satellites other than the one that is being looked for (for which the intercorrelation functions are null) is eliminated, so that only data from the satellite m is retained. Correlation is possible because the duration of a spreading sequence is one twentieth the duration of a data bit.

The signal acquisition phase therefore consists in calculating the correlation of the received signal with the local duplicate of the satellite code that is being looked for, over a time period equal to the period of the code, which is 1 ms, and with a depth (bound of the integral) depending on the required detection performance. The receiver delays the start of the duplicate to obtain a triangular correlation peak. The value of this delay is therefore the time taken by the signal to propagate from the satellite to the user. This kind of measurement demands extremely high accuracy (better than 100 nanoseconds). The time taken by the signal to travel this distance is of the order of 100 milliseconds. However, because the clock of the GPS receiver is never fully synchronized to that of the satellites, the receiver has to adjust its clock constantly by a process of successive approximations to arrive at the maximum correlation of the two signals. Acquisition of the signal therefore necessitates a time sweep by the receiver.

Furthermore, the signal transmitted by each satellite is transmitted at a known frequency of 1575.42 MHz. The Doppler effect of the satellite, on which is superimposed a receiver local clock uncertainty, results in an uncertainty of ±5 kHz in respect of the signal received by the GPS receiver. Now, to obtain a good correlation, the signal generated locally by the receiver must have the same frequency as the signal transmitted by the satellite. Thus, in addition to the time sweep, the receiver must perform a frequency sweep in order to determine the time taken by the signal to propagate from the satellite to the user.

The time and frequency sweeps referred to above imply a very long data processing time and entail a receiver having a very high computation power.

One solution is to use a server to assist the GPS receiver of the mobile device by increasing its sensitivity by reducing the time-frequency area to be swept. A server of this kind is described in "Indoor GPS Technology" (F. van Diggelen et al., CTIA Wireless-Agenda, Dallas, May 2001). This technology is known as the assisted GPS (A-GPS) technology. FIG. 1 represents a telecommunication system 1 using an assistance server 5 of this kind. A mobile device 2 including a GPS receiver, such as a mobile telephone of a GSM type telephone network 4, is seeking to calculate its position from signals P1 to P4 transmitted by at least one of the satellites S1 to S4. To this end, the device 2 sends a request R in the form of a radio signal over the telephone network 4. The request R passes through a base transceiver state (BTS) type radio base station 3 associated with the cell in which the mobile device 2 is located. The request R is processed by the server 5, which receives satellite information in real time via fixed radio stations 6 equipped with GPS receivers receiving information K. In response to the request R, the server 5 sends to the mobile device 2 information I that passes through the BTS 3. The information contains, for example, the ephemerides of the satellites S1 to S4. Using that information, the mobile device 2 can determine the Doppler effect of the satellites and considerably curtail its frequency sweep. Note that there are two types of A-GPS technology, namely mobile station based (MS-based) and mobile station assisted (MS-assisted). In the case of the MS-based technology, the position of the mobile device 2 is calculated by the mobile device itself. In the case of the MS-assisted technology, the position of the mobile device 2 is calculated by the server 5.

Certain difficulties remain when using this kind of solution, however. In fact, one of the drawbacks of the above solution lies in the acquisition of data successively and independently for each satellite (determination of the signal propagation time, usually referred to as navigation signal acquisition); this kind of acquisition leads to a very long data processing time.

The present invention aims to provide a faster method for acquisition of satellite data by a mobile device including an RNSS satellite radio navigation receiver.

SUMMARY OF THE INVENTION

To this end the present invention proposes a method of acquisition of satellite data by a mobile device including an RNSS satellite radio navigation receiver, said method including the following steps:

said receiver receiving a signal transmitted by a plurality of satellites and corresponding to a sum of signals each transmitted by a satellite and each modulated by a spread spectrum signal characteristic of said satellite, said receiver generating a plurality of local duplicates each of which is the duplicate of a spread spectrum signal characteristic of a satellite, correcting the frequency of each of said local duplicates by compensating the Doppler effect of each of said satellites using assistance data sent by an assistance server to said mobile device, summing said plurality of corrected duplicates, and determining the correlation function as a function of time between the sum of said plurality of corrected duplicates and said satellite data signal.

Thanks to the invention, the correlation is that between the signal received from the satellites and the sum of the local duplicates of all the satellites assumed to be present in the received signal. In this way, a single correlation function is determined instead of a plurality of successive correlation functions being determined independently for each local duplicate. Acquisition of the data is therefore much faster in that a plurality of correlation function calculations is replaced by a single calculation. It suffices thereafter to associate each of the correlation peaks with a particular satellite. This solution is made possible only by using frequency correction of the Doppler effect of each satellite to obtain a correlation function showing the correlation peaks correctly, each correlation peak being associated with a satellite.

Said method advantageously includes identifying each of the satellites associated with each of the correlation peaks revealed by said correlation function.

It is particularly advantageous if the identification of at least one satellite includes the following steps:

identifying the synchronization time associated with a correlation peak, determining a plurality of correlations calculated for said synchronization time between each of said corrected duplicates and said satellite data signal, and identifying the satellite associated with said correlation peak as a function of said correlations.

Said peak is advantageously a main peak of said correlation function as a function of time.

In a first embodiment, after at least one satellite has been identified, each of the remaining satellites is identified, using assistance data sent to said mobile device from an assistance server, said assistance data including the ephemerides of said satellites and the identifier of the cell in which said mobile device is located, by determining the propagation time difference of a signal between said satellites already identified and said mobile terminal, on the one hand, and each of the satellites to be identified and said mobile device, on the other hand.

In a second embodiment, each of said satellites is identified by the following steps:

identifying the synchronization time associated with a correlation peak,
determining a plurality of correlations calculated for said synchronization time between each of said corrected duplicates and said satellite data signal, and
identifying the satellite associated with said correlation peak as a function of said correlations.

The correlation function as a function of time is advantageously determined by the following steps:
determining the Fourier transform of each of said corrected duplicates,
summing said Fourier transforms of each of said corrected duplicates,
determining the Fourier transform of said satellite data signal,
multiplying each sum of said Fourier transforms by the Fourier transform of said satellite data signal, and
determining the inverse Fourier transform of the product obtained by the preceding step.

Said frequency correction of each of said local duplicates by compensation of the Doppler effect of each of said satellites is advantageously effected with the aid of assistance data sent from an assistance server to said mobile device.

The present invention also provides an RNSS satellite navigation receiver for implementing the method according to any one of the preceding claims, said receiver being adapted to receive a signal transmitted by a plurality of satellites and corresponding to a sum of signals each transmitted by a satellite and each modulated by a spread spectrum signal characteristic of said satellite, and said receiver including
means for generating a plurality of local duplicates each of which is the duplicate of a spread spectrum signal characteristic of a satellite,
means for correcting the frequency of each of said local duplicates by compensating the Doppler effect of each of said satellites using assistance data sent by an assistance server to said receiver,
an adder adapted to sum said corrected duplicates, and
means for calculating the correlation function as a function of time between each sum of said corrected duplicates and said satellite data signal.

The present invention finally provides a mobile device incorporating a receiver according to the invention.

Other features and advantages of the present invention become apparent in the course of the following description of one embodiment of the invention provided by way of illustrative and nonlimiting example.

DETAILED DESCRIPTION OF THE PREFERRED EMBODIMENT

Figure 1:
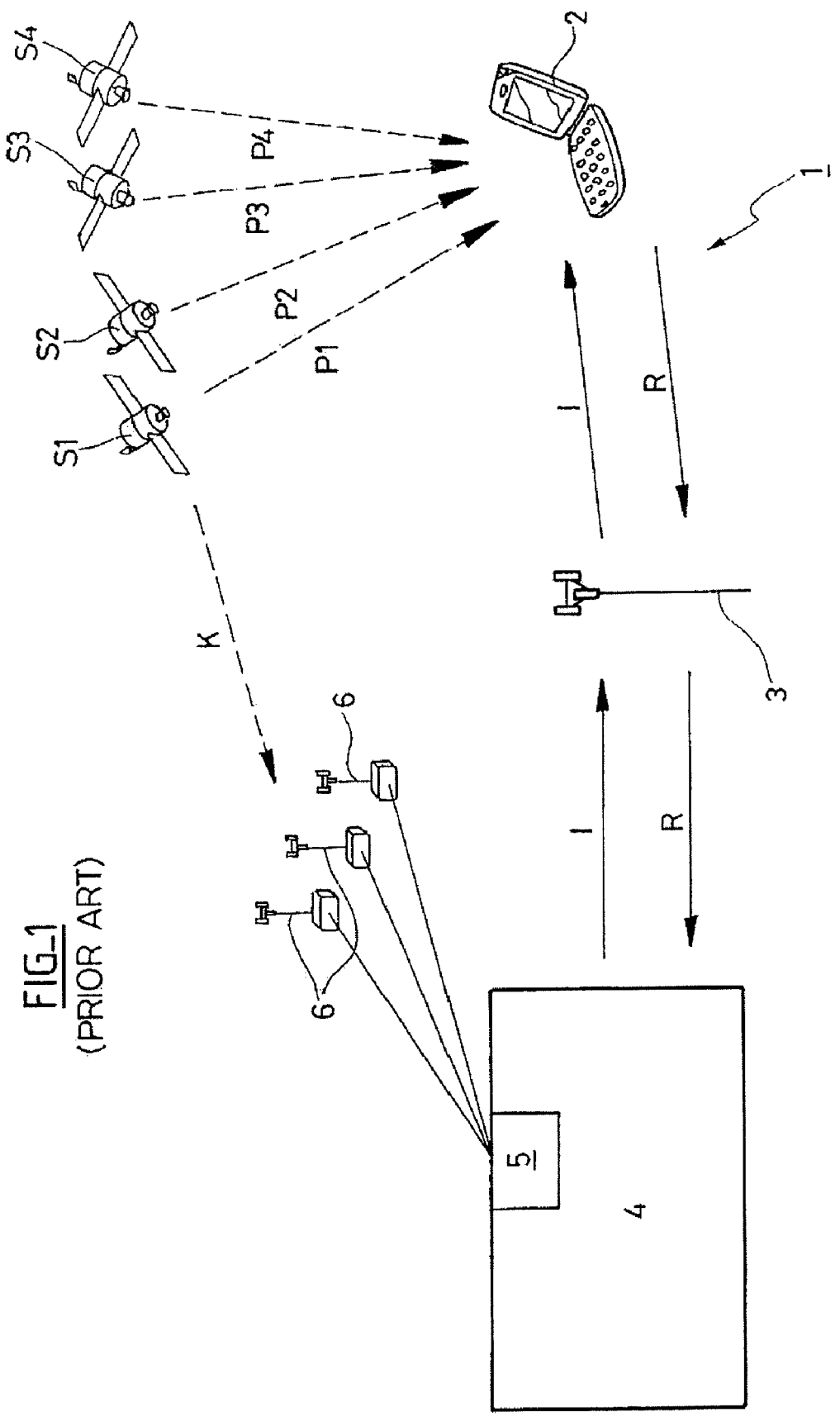
FIG. 1 represents a prior art telecommunication system.

FIG. 1 has already been described in relation to the prior art.

Figure 2:
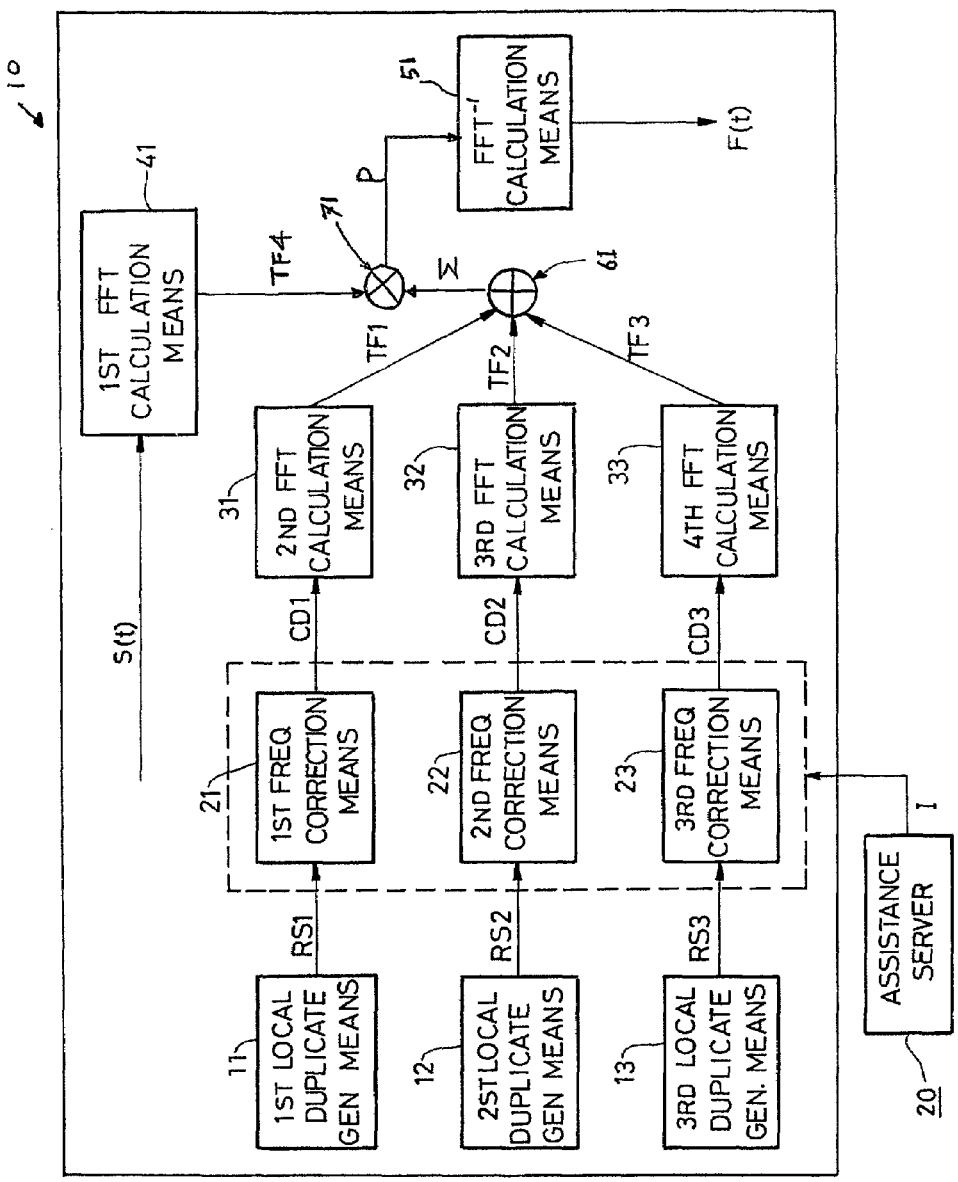
FIG. 2 represents a receiver using the acquisition method of the invention.

FIG. 2 represents a GPS receiver 10 integrated into a mobile device, not shown, such as a mobile telephone in a GSM type telephone network. The receiver 10 receives a signal S(t) which is the sum of all the signals transmitted by each satellite:

$$S(t) = \sum_{k=1}^{n} c_k(t) \cdot d_k(t),$$

where n is the number of satellites, $c_k(t)$ is a spread spectrum signal from a satellite k and $d_k(t)$ is data received from the satellite k. To illustrate the invention without overcomplicating the figures, the situation considered here is that where n=3, although it is normally necessary to use at least four satellites.

The receiver 10 includes:
first, second, third and fourth Fourier transform calculation means 41, 31, 32 and 33, respectively,
first, second and third local duplicate generation means 11, 12 and 13, respectively,
first, second and third frequency correction means 21, 22 and 23, respectively,
inverse Fourier transform calculation means 51,
an adder 61, and
a multiplier 71.

The first, second and third local duplicate generation means 11, 12 and 13 generate local duplicates RS1, RS2 and RS3, respectively, of the spread spectrum signals C1, C2 and C3 characteristic of the three satellites.

The mobile device into which the receiver 10 is integrated sends a request in the form of a radio signal over the telephone network. This request passes through a base transceiver state (BTS) type radio base station associated with the cell in which the mobile device is located and is processed by an assistance server 20 that receives satellite information in real time via fixed radio stations equipped with GPS receivers receiving that information. In response to the request, the assistance server 20 sends to the mobile device assistance data (I) that includes in particular the ephemeredes of the three satellites, the identifier of the cell in which the mobile device is located and the GPS times of the three satellites. Using this information, the first, second and third frequency correction means 21, 22 and 23, respectively, are able to determine the Doppler effect of the satellites and to curtail the frequency sweep considerably by correcting the frequency of the local duplicates RS1, RS2 and RS3 to take account of the Doppler effect of each satellite. This produces three corrected duplicates CD1, CD2 and CD3.

The second, third and fourth Fourier transform calculation means 31, 32 and 33 respectively calculate the Fourier transforms TF1, TF2 and TF3 of the corrected duplicates CD1, CD2 and CD3.

Similarly, the first Fourier transform calculation means 41 calculate the Fourier transform TF4 of the received signal S(t).

The adder 61 calculates the sum Σ of the three Fourier transforms TF1, TF2 and TF3 of the corrected duplicates CD1, CD2 and CD3.

The multiplier 71 calculates the product P of the Fourier transform TF4 and the sum Σ.

The inverse Fourier transform calculation means 51 determine the inverse Fourier transform F(t) of the product P.

The signal F(t) corresponds to the correlation as a function of time between the sum of each of the corrected duplicates CD1, CD2 and CD3 and the satellite data signal S(t).

Figure 3:
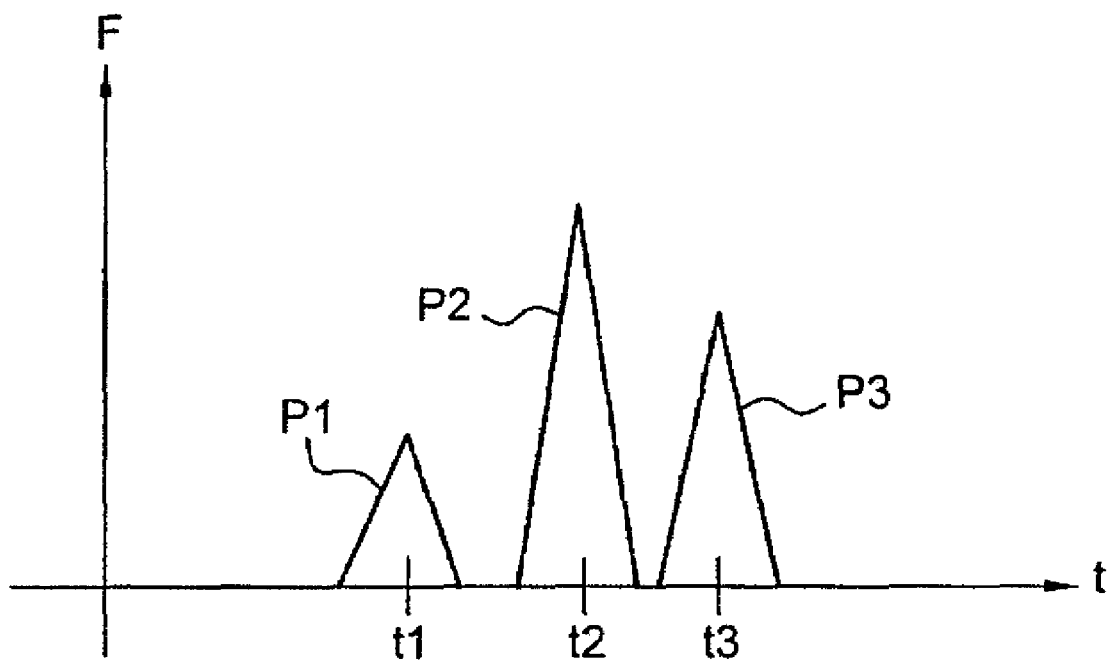
FIG. 3 represents a correlation graph illustrating the operation of the acquisition method of the invention.

FIG. 3 represents a correlation graph illustrating the method of the invention.

The graph 1 includes a curve representing the correlation function F as a function of a time variable t between the sum Σ for each of the corrected duplicates CD1, CD2 and CD3 and the satellite data signal S(t).

The curve has three peaks P1, P2 and P3 centered on times t1, t2 and t3 respectively corresponding to the times of synchronization of the satellites with the GPS receiver 10.

Correction of the Doppler effect of each satellite by the first, second and third frequency correction means 21, 22 and 23, respectively, clearly shows up each correlation peak associated with a particular satellite.

It then remains to associate each of the peaks P1, P2 and P3 with one of the satellites.

One solution for identifying the peaks consists in first determining the peak with the highest level, which here is the peak P2 centered on the time t2. That time t2 corresponds to the time of synchronization of the satellite to be identified with the GPS receiver 10.

Calculating the correlation of each of the corrected duplicates CD1, CD2 and CD3 with S(t) for only the time t2 identifies the satellite associated with the peak P2, the highest correlation value corresponding to the satellite that is being looked for.

Thus only three correlations at a time t2 are needed to determine the satellite associated with the peak P2.

This operation may be repeated for the other peaks P1 and P3.

However, the satellites associated with the peaks P1 and P3 may equally be identified as follows, based on the identification of the satellite associated with the peak P2.

Identifying the satellite associated with the peak P2 yields the GPS time.

The assistance data (I) sent by the assistance server 20 contains the ephemerides of the three satellites and the identifier of the cell in which the mobile device is located.

The positions of the three satellites can then be determined from the ephemerides and the GPS time.

Similarly, the identifier of the cell gives an order of magnitude of the position of the mobile device.

The times T1, T2 and T3 necessary for a signal to travel the distance between each of the satellites and the mobile device are deduced from the positions of the satellites and the mobile device.

Let T2 be the time necessary for a data signal to travel the distance between the satellite already identified and the mobile device.

Comparing the absolute values of the time differences T2−T1 and T2−T3 with the absolute values of the time differences t2−t1 and t2−t3 identifies the two remaining satellites whose peaks are centered on t1 and t3.

Of course, the invention is not limited to the embodiment that has just been described.

Thus the correlation function F(t) has been described as being determined using Fourier transforms, but the use of other methods may equally be envisaged, in particular direct application of the definition of the correlation functions F(τ) of two signals $f_i(t)$ and $f_j(t)$ given by the equation:

$$f(\tau) = \int_{+\infty}^{-\infty} f_j(t) \cdot f_i(t-\tau) \cdot dt.$$

Moreover, correction of the Doppler effect does not necessarily imply systematically requesting assistance data (I); storing the Doppler effect in memory in the GPS receiver and using it more than once without updating it may equally be envisaged.

Note equally that the summation may be effected over all of the duplicates assumed to be present in the received signal or over only a subgroup of at least two of those duplicates.

There is claimed:

1. A method of acquisition of satellite data by a mobile device including a radio navigation satellite system (RNSS) receiver, said method comprising:
   receiving a signal transmitted by a plurality of satellites and corresponding to a sum of signals each transmitted by a satellite and each modulated by a spread spectrum signal characteristic of said satellite;
   generating a plurality of local duplicates each of which is the duplicate of a spread spectrum signal characteristic of a satellite;
   correcting a frequency of each of said local duplicates by compensating a Doppler effect of each of said satellites using assistance data sent by an assistance server to said mobile device;
   summing the corrected duplicates;
   determining a correlation function as a function of time between the sum of the corrected duplicates and said satellite data signal; and
   identifying each of the satellites associated with each of correlation peaks revealed by said correlation function,
   wherein, after the at least one satellite has been identified, each remaining satellite is identified, using assistance data sent to said mobile device from an assistance server, said assistance data including ephemerides of said plurality of satellites and an identifier of a cell in which said mobile device is located, by determining a propagation time difference of a signal between the at least one satellite already identified and said mobile device, on the one hand, and each of the remaining satellites to be identified and said mobile device, on the other hand.

2. A method according to claim 1, wherein in the identifying the each of the satellites, identifying at least one of the satellites comprises:
   identifying a synchronization time associated with a correlation peak;
   determining a plurality of correlations calculated for said synchronization time between each of the sum of the corrected duplicates and said satellite data signal; and
   identifying the at least one of the satellites associated with said correlation peak as a function of said correlations.

3. A method according to claim 2, wherein said peak is a highest peak among the correlation peaks of said correlation function as a function of time, and the highest peak is first identified among the correlation peaks.

4. A method according to claim 1, wherein the identifying each of the satellites comprises:
   identifying a synchronization time associated with a correlation peak;
   determining a plurality of correlations calculated for said synchronization time between each of the sum of the corrected duplicates and said satellite data signal; and
   identifying a satellite associated with said correlation peak as a function of said correlations.

5. A method according to claim 1, wherein said correlation function as a function of time is determined by operations of:
   determining a Fourier transform of each of said corrected duplicates;
   summing the Fourier transform of each of said corrected duplicates;
   determining a Fourier transform of said satellite signal;

multiplying the sum of the Fourier transform of the each of said corrected duplicates by the Fourier transform of said satellite signal; and determining an inverse Fourier transform of a result of the multiplying.

6. A radio navigation satellite system (RNSS) receiver for implementing the method according to claim 1, said receiver being adapted to receive a signal transmitted by a plurality of satellites and corresponding to a sum of signals each transmitted by a satellite and each modulated by a spread spectrum signal characteristic of said satellite, and said receiver comprising:

means for generating a plurality of local duplicates each of which is the duplicate of a spread spectrum signal characteristic of a satellite;

means for correcting a frequency of each of said local duplicates by compensating a Doppler effect of each of said satellites using assistance data sent by an assistance server to said receiver;

an adder adapted to sum the corrected duplicates; and means for calculating a correlation function as a function of time between the sum of the corrected duplicates and said satellite data signal.

7. A mobile device incorporating a radio navigation satellite system (RNSS) receiver according to claim 6.

* * * * *